United States Patent [19]
Ancey et al.

[11] 3,750,898
[45] Aug. 7, 1973

[54] AUTOMATIC DRILLING-ROD TRANSFER DEVICE

[75] Inventors: Gerard Ancey, L'Hay-les-Roses; Rene Bourree, Fontenay-aux-Roses, both of France

[73] Assignee: Groupement Atomique Alsacienne Atlantique, Le Plessis-Robinson, France

[22] Filed: Oct. 29, 1971

[21] Appl. No.: 193,724

[30] Foreign Application Priority Data
Oct. 30, 1970 France .............................. 7039317

[52] U.S. Cl. ................. 214/1 Q, 214/2 S, 214/110
[51] Int. Cl. ............................................. E21b 19/00
[58] Field of Search ..................... 214/1 Q, 1 P, 2.5, 214/146.5, 148; 104/93

[56] References Cited
UNITED STATES PATENTS

| | | | |
|---|---|---|---|
| 3,651,959 | 3/1972 | Castela et al. ................. | 214/1 Q X |
| 1,816,031 | 7/1931 | Willis ................................ | 104/93 |
| 1,738,211 | 12/1929 | Schaub ........................... | 214/707 X |
| 2,582,329 | 1/1952 | Harter, Jr. et al. .............. | 214/2.5 X |
| 3,651,955 | 3/1972 | Shkredka ....................... | 214/1 Q X |

Primary Examiner—Gerald M. Forlenza
Assistant Examiner—Frank S. Werner
Attorney—Richard C. Sughrue, Donald E. Zinn et al.

[57] ABSTRACT

The device enables the automatic transfer of drilling rods held in the vertical position inside a derrick to a horizontal position near to a storage area and the reverse transfer operation, and comprises a carriage provided with bistable chucks for holding a triple set of rods during transfer. The carriage moves along two pairs of rails; the first pair of rails is horizontal, the second pair of rails starts off as an inclined curve through an angle of 30° to 45° in relation to the horizontal position and coming into the vertical position near the derrick, thus, the center of gravity of the load carriage describes a straight line.

3 Claims, 6 Drawing Figures

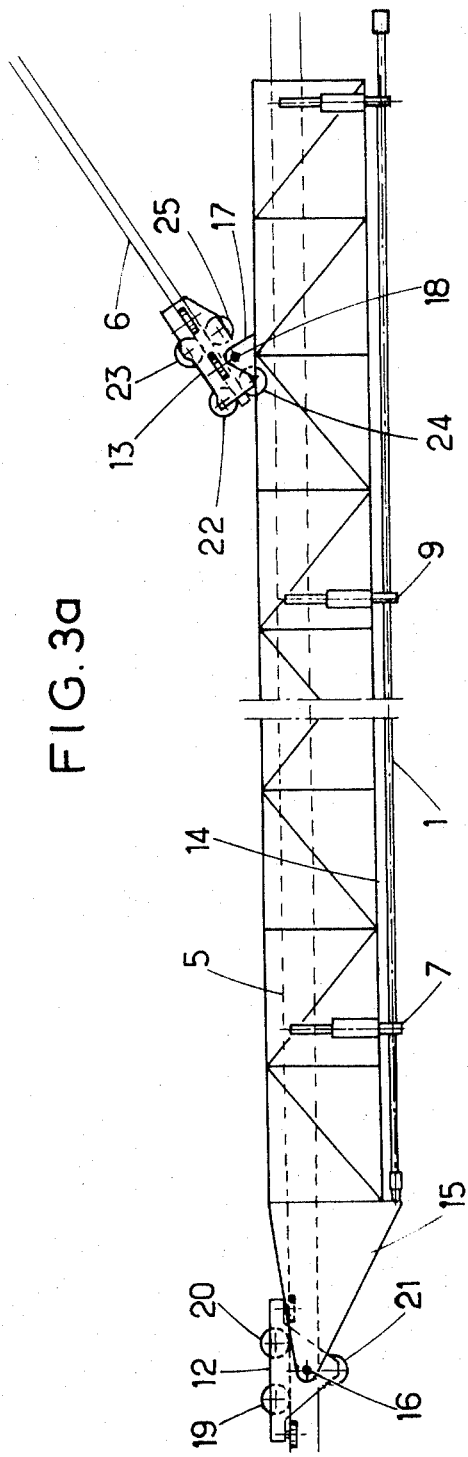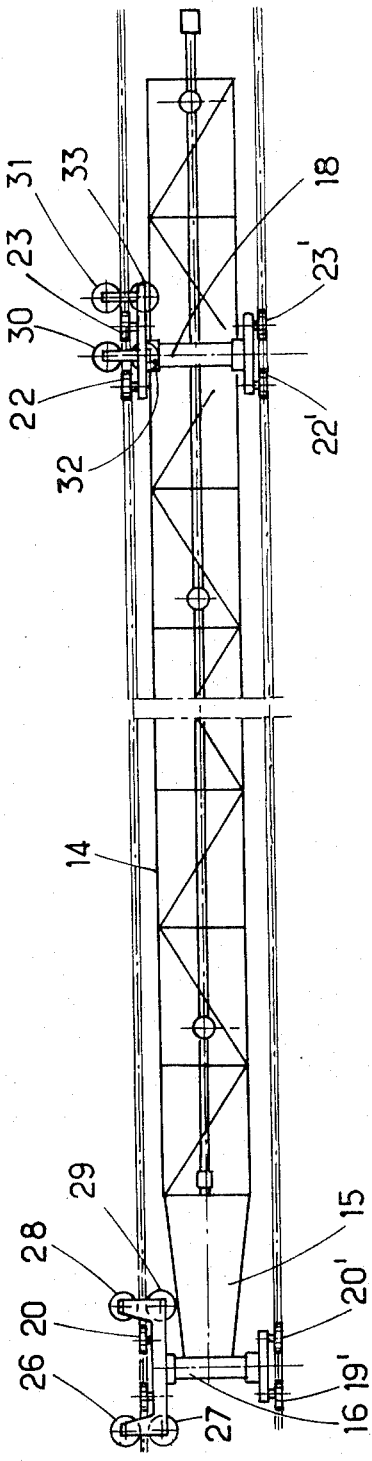

AUTOMATIC DRILLING-ROD TRANSFER DEVICE

BACKGROUND OF THE INVENTION

1. FIELD OF THE INVENTION

This invention relates to an automatic handling device which, in a derrick, picks up drilling rods or groups of drilling rods in a vertical position, returning them in a horizontal position to a means of transfer to their place of storage and, under the same conditions, permits the inverse transfer operation.

2. DESCRIPTION OF THE PRIOR ART

This invention is very useful in connection with very deep drilling; however, it has its full use in all ocean drilling performed from a ship or a floating platform at least partially subject to oscillation movements brought about by the swell. In this case, if the rods are stored vertically on a vertical rack, inside the derrick, they are liable to exert upon the latter excessive lateral stresses the moment the floating support is sufjected subjected oscillations of a certain amplitude. Furthermore, for reasons of speed in assembly, the rods are generally stocked in triple length, so that their vertical storage can noticeably modify the position of the center of gravity of the floating mass and therefore reduce the stability of the ship. It thus becomes necessary, in connection with each operation involving the raising of a set of rods, to proceed to the provisional horizontal storage of these rods outside the derrick.

To avoid any even provisional stacking of rods on the vertical rack in the derrick, it is evident that the rods must be transferred at a rate equal to the rate of extraction of the triple lengths of rod by the block and tackle of the derrick.

In the following, the term "horizontal plane" will be used in referring to a plane parallel to the bridge of the ship and the direction perpendicular to this plane will be the vertical.

The transfer of rods from the vertical position to the horizontal position could be accomplished very simply by suspending the set of three rods from a cable connected to a winch, but such a means offers only unilateral connection between the triple group and the framework; it is therefore not adapted for a transfer on board a vessel subject to oscillations. It thus appears necessary to the expert in the field to connect this group of three rods to a relatively rigid beam and to provide for a bilateral connection between the triple group and the beam, which is itself subjected to a perfectly defined, limited movement The various solutions developed and known to the applicant however do not fully satisfy the user. In effect, the solutions retained here essentially boil down to two types: in the first of these, the group of three rods, placed vertically in a plane passing through the axis of the derrick at the periphery of the latter, is linked to a vertical swinging beam which pivots in the median plane of the derrick around a horizontal axis, so that the beam will bring the group of three rods from the vertical position into the horizontal position and vice versa by rotation around its lower horizontal axis. A transfer by means of the swinging beam, among other things, entails the inconvenience of requiring a big opening on the order to the height of the triple rod in the derrick, which weakens it unfavorably.

In the second type of possible solution, we connect the triple rod to a beam provided with two guidance devices; one of them is essentially vertical and moves the head of the triple rod from its top position to the level of the base of the derrick by a vertical displacement, while the other end of the beam describes a horizontal path which ends in the proximity of the derrick by means of an incline. This kind of device however presents many inconveniences. The first of these resides in the fact that the center of gravity of the assembly follows a path that is very far removed from the straight line. It follows from this that the beam movement motor must perform very irregular work. Since the transfer must be accomplished within a period of time less than 30 second, the maximum power output required of the motor becomes very large. The second inconvenience resides in the fact that the movement of the beam of the kind described above causes a portion of the triple rod column to pass into the median plane of the derrick, interrupting the work of the principal block and tackle of the derrick for a certain period of time. This latter inconvenience however can be avoided by performing the transfer in a plane which deviates from the axis of the derrick in a considerable fashion. It is then necessary to subject the set of three vertical rods to a supplementary centering operation.

Furthermore, the two transfer solutions known to the applicant bring the end of the rods in the horizontal position into the interior of the derrick, which interferes with work around the turntable. Finally, the horizontal storage of the rods under the derrick presents difficulties by virtue of the existence of an infrastructure which is connected to the derrick. It is then necessary to subject the horizontal rods to a new translation in order to move them away from the foot of the derrick, and this once again leads to loss of time.

Applicant was therefore persuaded to seek a solution to the problem of transferring a set of three rods, placed in a vertical position, at a precise point on the derrick, toward a well-determined horizontal position, where the group of three rods is directly accepted by a first storage means.

SUMMARY OF THE INVENTION

The object of the invention thus is an automatic device for the transfer of drilling rods or groups of drilling rods from the vertical position, inside the derrick, to the horizontal position, at a certain distance from the latter and vice versa, comprising a carriage to which are attached the automatic pickup members of said groups of drilling rods, rolling means connected to the two ends of the carriage, a guidance assembly consisting of a frame resting at two points on a plane called "horizontal plane," linked to the base of the derrick, connected in its upper portion to the derrick, supporting two pairs of rails guiding the rolling means of the carriage, an upper pair guiding the top end of the carriage and a lower pair guiding the low end of the carriage, characterized by the fact that the upper pair of guide rails is connected with the horizontal plane by a straight-line portion forming an angle between 30° and 45° with said horizontal plane.

In most of the constructions put up by the applicant, the pair of upper guide rails is made up of two portions of straight lines connected to each other by a curve with a large curvature radius; the upper straight portion being essentially vertical.

The pair of lower rails generally is contained in a horizontal plane. In certain cases, these rails may however involve, in the portion closest to the derrick, a concave curved element facing upward and having a short length. In all cases, we find, according to the invention, that the trajectory of the center of gravity moves very little from the straight line joining the positions occupied by the center of gravity at the start and the finish. It follows from this that the power, which the carriage movement motor must supply, must retain an essentially constant value.

As one studies the trajectory of the head of the triple rod, it is seen that it passes at a certain distance from the central pulley so that is will not disturb the simultaneous operation of the latter.

The examination of the trajectory of the set of rods shows that the entrance of the rods into the interior of the derrick requires only a very small-dimensioned opening in the face of the derrick which practically does not weaken the latter. Finally, when the carriage lowers a group of three drilling rods, it is easy to arrange a first storage means, such as an elevator, used for receiving the rods coming from the pickup members of the carriage, without being interfered with by the infrastructure components of the derrick, the end of the group of three rods, at the moment of discharge, being at a distance from the well which is approximately equal to the length of a rod.

In a device according to the above description, in which the portion that is furthest removed from the carriage, is a straight line situated in the horizontal plane, the carriage is moved in a very simple manner by cables or by chains, acting only upon the lower end of the carriage.

The carriage itself consists of a lattice beam. It comprises, in front and in the rear, two bogies, one of which involves guide rollers. The carriage supports the clamps for grasping the group of three rods. These clamps make it possible to grasp the group of three rods when it is in a predetermined vertical position, to hold these rods linked to the carriage during the transfer, and to release the rods, which have arrived in horizontal position, above the first element in the storage chain, and to perform the inverse operations.

The operation of opening and closing the clamps in the two extreme positions of the carriage is controlled by the movement of a slide activated by a set of jacks.

Other features and advantages of the invention will emerge better from the following description which is given here by way of example and without any restrictions, reference being made to the attached drawing.

BRIEF DESCRIPTION OF THE DRAWINGS

FIG. 3a is a lateral view showing the rolling means of the carriage.

FIG. 3b is a top view bringing out the lateral guidance rollers.

DESCRIPTION OF THE PREFERRED EMBODIMENT

Figure 1B:
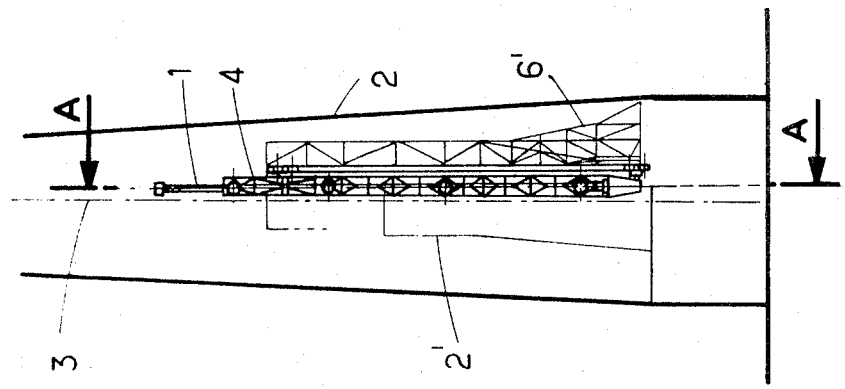
FIG. 1b is a front elevation view of the same installation, showing the opening of the derrick to the left and the frame of said derrick to the right.
Figure 1A:
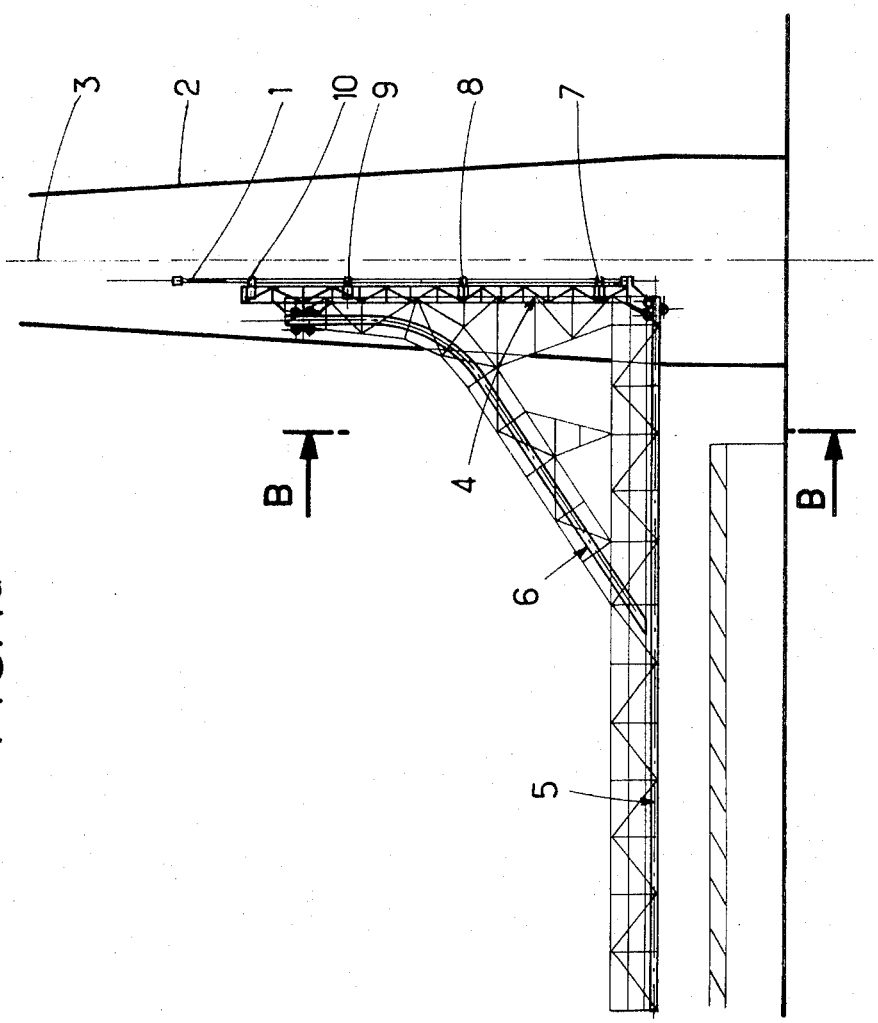
FIG. 1a is a lateral elevation view of a drilling derrick comprising a device according to the invention in which the set of three rods is in the vertical position.

FIG. 1a shows, at 1, a group of three drilling rods, arranged vertically within a derrick, shown schematically by means of its external contour 2 and by means of its median axis 3; the assembly is arranged on board a ship. The group of three rods 1 is arranged at a certain distance from the median axis 3 so as to permit simultaneous operations. carriage 4 rests with its lower portion on horizontal rails 5 and with its upper portion on upper rails 6. As one can see, these rails start from the horizontal at an angle of about 30°, following a straight-line portion which connects to an essentially vertical part by means of an arc with a large curvature radius. The group of three rods is firmly connected to the carriage by the four clamps 7, 8, 9 and 10.

FIG. 1b gives a better view of the entire wind-bracing 6' necessary to give the frame of the guide rails sufficient rigidity so that the carriage 4 will not be subjected to inopportune oscillations in case of swell. We can see also that opening 2' of the derrick has a definitely lower height than the triple rod 1 and that the derrick is thus more solid than in the case where the beam tilts around a horizontal axis.

Figure 2A:
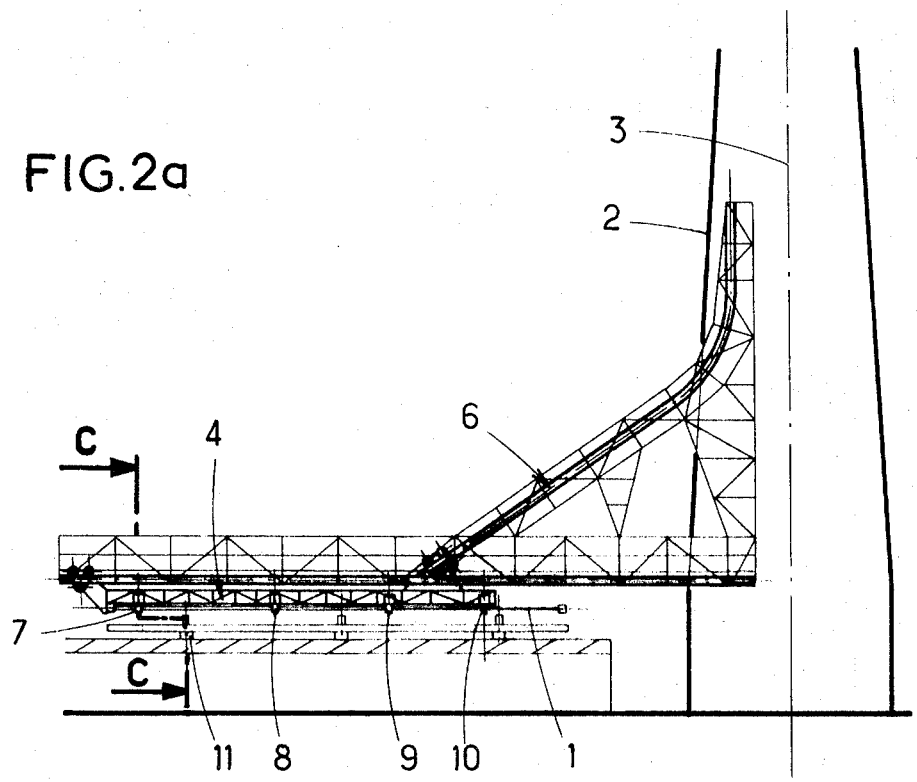
FIG. 2a is a lateral elevational view of the same derrick where the set of three rods and the carriage support are in the low position.
Figure 2B:
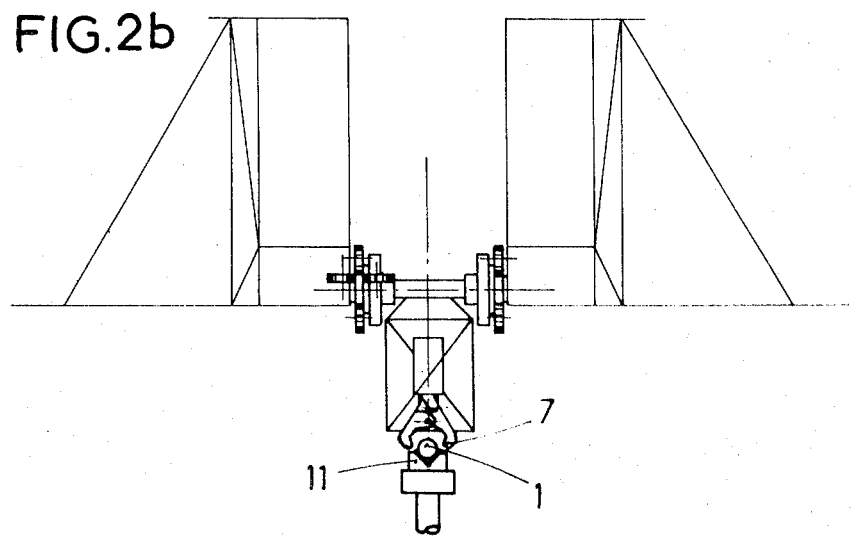
FIG. 2b is a partial cross-section of FIG. 2, showing the unloading operation.

FIG. 2a shows carriage 4 and the set of three rods 1 which it supports, in the horizontal position. The set of three rods is then above the first element in the storage chain, shown schematically by a hoist in the form of a spout 11. The cross-section along CC, shown in FIG. 2b, illustrates the open clamps 7 and the released rod set 1 rests on the spout 11 of the hoist.

FIG. 3a describes the carriage 4 in a more detailed manner. In this elevation view, we see appearing one of the horizontal rails 5, as well as the start of ascending rail 6. The carriage is suspended by means of composite bogies 12 and 13, respectively, at rail 5 and 6.

The carriage comprises a lattice beam 14, terminated by a beam 15 which is articulated at 16 with respect to bogie 12. The lattice beam 14 is connected to bogie 13 by means of a beam 17 articulated at 18. Beam 14 is in one piece with clamps 7, 9 and 10 which make it possible to hold the triple rod 1 in place. Bogie 12 involves four roller discs 12, 20, 19' and 20' and two counter-discs such as 21. Bogie 13 also includes four roller discs 22, 23, 22' and 23' as well as four counterdiscs such as 24 and 25.

In the top view in FIG. 3b, we see the lattice structure of beam 14, as well as the lower beam 15 and the upper beam 17. The articulation axis 16 of beam 15 around bogie 12 appears more clearly. Moreover, although one always sees the roller discs, such as 19 and 20, of this bogie 12, one can also see appear the roller discs 19' and 20', corresponding to the second rail. Finally, we note that the left-hand rail turning toward the derrick is linked in a bilateral fashion to the bogie by a set of four retaining discs 26, 27, 28 and 29, whereas the right-hand side is left free. It may in effect happen that as the result of a particularly large oscillation imparted to the ship by the surge of the sea, the rails will be subjected to a very high stress, bringing about a very slight relative deformation of the two rails. It is necessary to prevent this stress from being transmitted to the carriage and, more particularly, from interfering with its movement.

The top view, FIG. 3b, shows that the upper bogie 13, in addition to the roller discs 22 and 23, involves a set of four retaining or lateral guidance discs 30, 31, 32 and 33. As in the case of bogie 12, bogie 13, on the other side, has only two roller discs 22' and 23'. This latter arrangement gives the assembly of the device the flexibility required by virtue of the fact that the incline 6 is linked to the structure of the derrick which is heavily stressed during oscillations caused by the surge of the sea.

The assembly of the grouping of four clamps connected to the carriage was the subject of Patent application No. 70 39 013, filed on Oct. 29, 1970. Here is described in particular the bistable operation of each of the clamps under the action of two jacks.

Each time the carriage is stopped in the vertical position and in the horizontal position, there is a set of two jacks opposite each clamp on the level of the slides. The jaws can receive two sets of cheeks permitting the retention of 12.7-centimeter (5-inch) and 8.9-centimeter (3.5-inch) rods.

The operation of this entire assembly can be understood easily: when a set of rods is taken down, each element of three rods is brought into the derrick at a predetermined point in such a way that said element will not interfere with the work of the pulley. From that instant on, a series of automatic operations brings the set of three rods into the horizontal position for placement on the first element in the storage chain. In effect, due to the action of the jacks, the cheeks of clamps 7, 8, 9, 10 grasp the triple element which is then made into one piece with the carriage 4. The latter, moved along by means of a traction cable, is set in motion in such a way that the upper portion descends down incline 6 while the lower portion moves along rails 5. The operation is controlled by a cable which slows dOwn the descent and which serves as traction cable when the transfer operation is reversed. When the carriage exactly occupies the unloading position, a contact controls the action of the jacks which open the cheeks of the clamps 7, 8, 9 and 10, and release the triple rod element.

The operation of bringing a set of rods back up involves the inverse transfer operations.

In the course of its movement, the center of gravity is moved no more than 1 meter away from the straight line joining the extreme positions of the center of gravity of the assembly formed by the triple rods and the carriage. The operation can thus be performed well in all cases with the expenditure of an essentially constant power requiring a motor with minimum output.

Although the device just described seems to be most advantageous for implementing the invention in a particular situation, it will be understood that various modifications can be made especially in the shape of the lower roller track which can be horizontal over a large portion of its path and which can end in an ascending curve, and that changes can be made in the connection of the upper roller track with its top position, without going beyond the framework of the invention, certain of its elements being capable of being replaced by others that can perform an equivalent technical function.

What is claimed is:

1. In an automatic device for the transfer of drilling rods or groups of drilling rods from the vertical position in the interior of a derrick to the horizontal position at a certain distance from the latter and vice versa, including: a carriage carrying automatic members for grasping said groups of drilling rods at longitudinal spaced positions, rolling means linked to the two ends of said carriage, a guidance assembly consisting of a frame resting at two points on a horizontal plane linked to the base of the derrick and connected in its upper portion to the derrick and supporting two pairs of rails guiding the carriage rolling means including a first pair guiding the front end of the carriage and a second pair guiding the rear end of the carriage, the improvement wherein the second pair of guide rails is contained in said horizontal plane, and said first pair of guide rails includes an upper vertical portion and a lower straight-line portion connected with said horizontal plane and forming an angle of between 30° and 45° therewith.

2. The device according to claim 1, wherein the rolling means consist of two bogies supported on the pairs of rails by means of roller discs, and connection means between the carriage and each bogie comprising horizontal rotation axes arranged respectively at the ends of the carriage.

3. The device according to claim 2 above, wherein each of the two bogies supporting the carriage comprises counterdiscs, carrier discs and retaining discs, respectively, each axis of said counterdiscs being parallel to the axis of the carrier discs and retaining discs situated on either side of the rail, whose axes are perpendicular to the former, and wherein only one of the sides of each of the bogies is provided with said retaining discs.

* * * * *